United States Patent
Parkison

(10) Patent No.: US 10,562,771 B1
(45) Date of Patent: Feb. 18, 2020

(54) FABRICATION OF URANIUM NITRIDE

(71) Applicant: Los Alamos National Security, LLC, Los Alamos, NM (US)

(72) Inventor: Adam Parkison, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 0 days.

(21) Appl. No.: 15/889,608

(22) Filed: Feb. 6, 2018

Related U.S. Application Data

(60) Provisional application No. 62/455,408, filed on Feb. 6, 2017.

(51) Int. Cl.
*C01B 21/06* (2006.01)
*G21C 3/62* (2006.01)

(52) U.S. Cl.
CPC .............. *C01B 21/063* (2013.01); *G21C 3/62* (2013.01); *C01P 2006/80* (2013.01)

(58) Field of Classification Search
CPC ..... C01B 21/063; C01B 21/0645; G21C 3/62; C01P 2006/80
See application file for complete search history.

(56) References Cited

U.S. PATENT DOCUMENTS

| | | | | |
|---|---|---|---|---|
| 2,534,676 A | * | 12/1950 | Newton | C01B 6/02 423/254 |
| 3,287,093 A | * | 11/1966 | Nelson | C01B 21/063 423/254 |
| 3,904,736 A | * | 9/1975 | Triggiani | C01B 21/063 252/635 |
| 7,029,571 B1 | * | 4/2006 | Bhattacharyya | C10G 11/18 208/75 |
| 2010/0303193 A1 | * | 12/2010 | Walters | G21C 3/02 376/412 |

FOREIGN PATENT DOCUMENTS

JP  54032198 A  *  3/1979  ........... C01B 21/063

OTHER PUBLICATIONS

Oral translation of JP54032198, 1979.*
Arai, Y., "Fabrication of (U, Pu)N Fuel Pellets", Journal of Nuclear Materials 168 (1989), pp. 280-289.
(Continued)

*Primary Examiner* — Jun Li
(74) *Attorney, Agent, or Firm* — Lewis Roca Rothgerber Christie LLP

(57) ABSTRACT

A method of producing uranium nitride (e.g., uranium mononitride) and/or uranium-containing intermediates that can be used to further produce uranium nitride includes reacting a reaction mixture comprising uranium carbide with a gas comprising hydrogen and nitrogen, cooling the reaction mixture to a temperature suitable to produce a phase comprising $U_2N_3$, and heating the reaction mixture to a temperature suitable to convert the phase comprising $U_2N_3$ to a phase comprising UN. The method produces highly purified UN, is insensitive to excess carbon reactants, and can be readily integrated into existing uranium production facilities as part of a continuous process.

9 Claims, 3 Drawing Sheets

(56) References Cited

OTHER PUBLICATIONS

Bauer, A., "Nitride Fuels: Properties and Potentials", Reactor Technology, vol. 15, No. 2, Summer 1972, pp. 87-104.
Besmann, T., et al., "Uranium nitride as LWR TRISO fuel: Thermodynamic modeling of U-C-N", Journal of Nuclear Materials 427 (2012), pp. 162-168.
Bowman, A. L. et al., "The Crystal Structures of UC2", Acta Cryst. (1966), 21, pp. 671-671.
Cordfunke, E.H.P., "Investigations of Uranium Carbonitrides (I) The Lattice Parameters of the Solid Solutions", Journal of Nuclear Materials 56 (1975), pp. 319-326.
Ledergerber, G., et al., "Preparation of uranium nitride in the form of microspheres", Journal of Nuclear Materials 188 (1992), pp. 28-35.
Lindemer, T.B., et al., "Chemical Thermodynamic Representation of Nonstoichiometry in <UO2-xN3x/4>", CALPHAD vol. 13, No. 2, pp. 109-113, 1989.
Lindemer, T.B., "Kinetics of the UO2-C-N2 Reaction at 1700C", Journal of The American Ceramic Society, vol. 55, No. 12, pp. 601-605.
Matthews, R.B. et al., "Fabrication and Testing of Uranium Nitride Fuel for Space Power Reactors", Journal of Nuclear Materials 151 (1988), pp. 334-344.
Mukerjee, S.K., "Kinestics of the carbothermic synthesis of uranium mononitride microspheres", Journal of Nuclear Materials 185 (1991), pp. 39-49.
Muromura, T., et al., "Mechanism and Kinetics for the Formation of Uranium Mononitride by the Reaction of Uranium Dioxide with Carbon and Nitrogen", Journal of the American Ceramic Society, vol. 61, No. 1-2, pp. 30-35.
Lee, H.M. et al., "Diffusion of Carbon and Uranium in Uranium Carbide", Journal of Nuclear Materials 27 (1968), pp. 275-284.
Ogawa, T., et al. "Thermodynamics of carbothermic synthesis of actinide mononitrides", Journal of Nuclear Materials 247 (1997), pp. 151-157.
Pautasso, G., et al., "Investigation of the Reaction UO2+x+PuO2+C+N2 by Thermogravimetry", Journal of Nuclear Materials 158 (1988), pp. 12-18.
Lindemer, T.B., et al., "Carbothermic synthesis of 820 μm uranium nitride kernels: Literature review, thermodynamics, analysis, and related experiments", Journal of Nuclear Materials 448 (2014), pp. 404-411.
Okamoto, H., et al., "C-U (Carbon-Uranium)", Binary Alloy Phase Diagrams, II Ed., vol. 1, 1990, pp. 892-893.

\* cited by examiner

FABRICATION OF URANIUM NITRIDE

CROSS-REFERENCE TO RELATED APPLICATION

This application claims priority to and the benefit of U.S. Provisional Application No. 62/455,408, filed Feb. 6, 2017 and titled "FABRICATION OF URANIUM NITRIDE", the entire content of which is incorporated herein by reference.

STATEMENT REGARDING FEDERALLY SPONSORED RESEARCH OR DEVELOPMENT

The United States government has certain rights in this invention pursuant to Contract No. DE-AC52-06NA25396 between the United States Department of Energy and Los Alamos National Security, LLC for the operation of Los Alamos National Laboratory.

BACKGROUND

Uranium mononitride (uranium nitride, UN) is an attractive nuclear fuel that is being considered as an alternative to conventional $UO_2$ nuclear fuels due to its higher thermal conductivity and melting point (e.g., temperature tolerance). However, the industrial use of uranium nitride has been limited by a lack of methods for the production of suitably large quantities.

Carbothermic reduction to nitridation (CTR-N) is presently the most commonly used process for producing uranium nitride. However, this process has historically been limited to batch processing techniques due to its use of a breathing furnace, which alternatingly exposes the uranium material to vacuum and various process gases. Such batch processing techniques are typically incompatible with nuclear fuel production facilities. Thus, the use of this process to produce uranium nitride has been limited.

SUMMARY

According to embodiments of the present disclosure, a method of producing uranium nitride (UN) includes reacting a reaction mixture including uranium carbide with a gas including hydrogen and nitrogen, cooling the reaction mixture to a temperature suitable to produce a phase including $U_2N_3$, and heating the reaction mixture to a temperature suitable to convert the phase including $U_2N_3$ to a phase including UN.

In some embodiments, the method may further include reacting $UO_2$ with at least three molar equivalents of carbon to form the reaction mixture including uranium carbide. In some embodiments, the at least three molar equivalents of carbon may be an excess of three molar equivalents of carbon. For example, the reaction mixture including uranium carbide may be formed by reacting $UO_2$ with at least three molar equivalents of carbon, and in some embodiments, an excess of three molar equivalents of carbon.

In some embodiments, reacting $UO_2$ with at least three equivalents of carbon may be accomplished under an active vacuum. In some embodiments, reacting $UO_2$ with at least three molar equivalents of carbon may be accomplished under an inert atmosphere including $N_2$, Ar, He, $H_2$, or a mixture thereof.

In some embodiments, the method may further include granulating the reaction mixture including uranium carbide prior to reaction with the gas including hydrogen and nitrogen.

In some embodiments, the method may further include repeating the processes of cooling the reaction mixture and heating the reaction mixture to purify the UN.

In some embodiments, the method may be a continuous process, in which the reaction mixture including uranium carbide is continuously moved through a series of at least first, second, and third reaction zones arranged in a sequence, wherein the first reaction zone has a temperature corresponding to reacting the reaction mixture including uranium carbide with the gas including hydrogen and nitrogen; the second reaction zone has a temperature corresponding to the cooling the reaction mixture to the temperature suitable to produce the phase including $U_2N_3$; and the third reaction zone has a temperature corresponding to the heating the reaction mixture to the temperature suitable to convert the phase including $U_2N_3$ to the phase including UN.

In some embodiments, cooling the reaction mixture to a temperature suitable to produce the phase including $U_2N_3$ may include cooling the reaction mixture below a phase transition temperature between the phase including $U_2N_3$ and the phase including UN. In some embodiments, the temperature suitable to produce the phase including $U_2N_3$ may be about 1352° C. to about 1132° C.

In some embodiments, heating the reaction mixture to the temperature suitable to convert the phase including $U_2N_3$ to the phase including UN may include heating the reaction mixture above a phase transition temperature between the phase including $U_2N_3$ and the phase including UN. In some embodiments, the phase transition temperature between the phase including $U_2N_3$ and the phase including UN may be greater than about 1352° C.

BRIEF DESCRIPTION OF THE DRAWINGS

These and other features and advantages of the present invention will be better understood by reference to the following detailed description when considered in conjunction with the accompanying drawings, in which.

DETAILED DESCRIPTION

Aspects of example embodiments of the present disclosure are directed toward a method of producing uranium nitride (e.g., uranium mononitride), and/or uranium-containing intermediates that can be used to further produce uranium nitride and other nuclear fuels. The method can be easily integrated into existing uranium production facilities as part of a continuous process.

Conventional methods of producing uranium nitride typically rely on a two-part process called carbothermic reduction to nitridation (CTR-N), also known as carbothermal reduction-nitridation. According to this process, carbon is used to reduce a metal oxide (e.g., uranium oxide), and the carbon atoms in the resulting metal carbide are subsequently replaced by nitrogen. The chemical reactions involved in an example conventional CTR-N process as applied to uranium compounds may be described by the equations listed in Scheme 1. In Scheme 1, Equation 1, uranium (IV) oxide (e.g., uranium dioxide, $UO_2$) is reacted with a carbon source (e.g., carbon) at a temperature greater than about 1450° C. in an inert atmosphere to produce uranium carbide (UC) and carbon monoxide (CO). In Scheme 1, Equations 2A and 2B, the uranium carbide and any excess carbon, respectively, are subsequently reacted with $H_2$ and $N_2$ gas to produce UN and to remove the carbon as HCN gas. The equilibria of both reactions can be driven forward by removing the gaseous products, for example, under vacuum or by selective absorption.

Scheme 1

$$UO_2 + 3C \rightleftharpoons UC + 2CO_{(g)} \qquad (1)$$

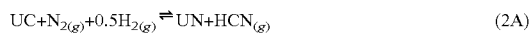
$$UC + N_{2(g)} + 0.5H_{2(g)} \rightleftharpoons UN + HCN_{(g)} \qquad (2A)$$

$$C + 0.5N_{2(g)} + 0.5H_{2(g)} \rightleftharpoons HCN_{(g)} \qquad (2B)$$

Figure 1:
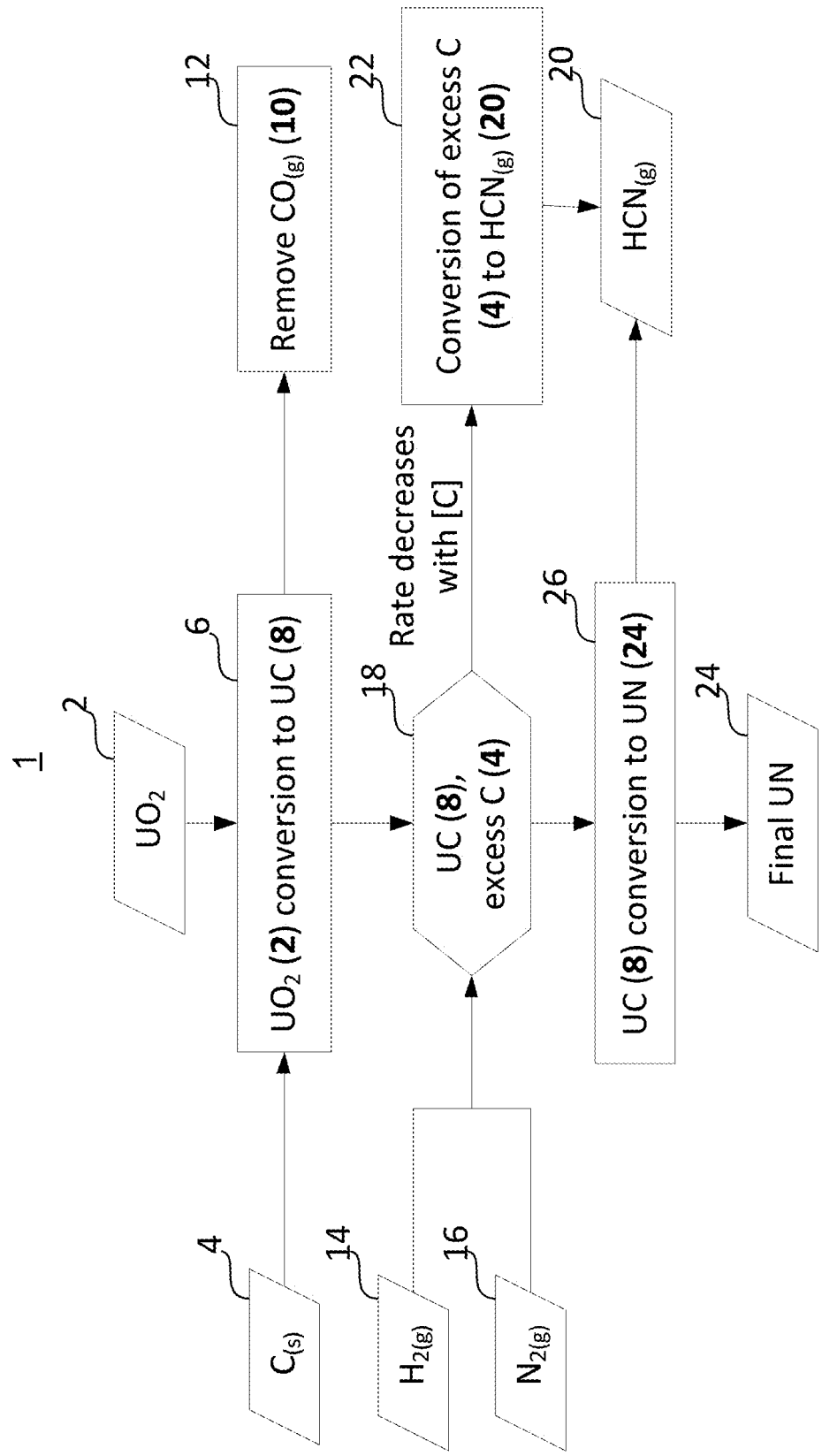
FIG. 1 is a block diagram showing a process or method of converting $UO_2$ to UN in the related art.

FIG. 1 is a block diagram 1 depicting the above-described method of converting $UO_2$ to UN in the related art. According to FIG. 1 and in accordance with Scheme 1, Equation 1, $UO_2$ (2) and $C_{(s)}$ (4) are mixed and reacted (block 6) to produce UC (8) and $CO_{(g)}$ (10), the latter of which (i.e., $CO_{(g)}$) is subsequently removed from the reaction (block 12). The mixture 18 of UC (8) and any excess C (4) is reacted with $H_{2(g)}$ (14) and $N_{2(g)}$ (16). In accordance with Scheme 2, Equation 2B, the excess C (4) in the reaction mixture is converted to $HCN_{(g)}$ (20), which is subsequently removed from the reaction (block 22). The rate of conversion is proportional to the concentration of C (4) in the mixture, and accordingly decreases over time. In accordance with Scheme 2, Equation 2A, the UC (8) in the reaction mixture is converted to UN (24) (block 26) with concomitant production of $HCN_{(g)}$ (20). The method is complete once enough UC (8) has been converted to UN (24) and enough C (4) has been removed to yield UN (24) as a final product having a desired level of purity.

The above-described CTR-N method has several limiting drawbacks. For example, the amount of carbon must be carefully controlled in the first part of the process (Scheme 1, Equation 1). An insufficient amount of carbon results in incomplete reaction of the $UO_2$, and thereby the presence of oxygen impurities in the final product. However, an excess amount of carbon results in the retention of carbon impurities. Therefore, the purity and utility of the final product depend on the addition of an exact, stoichiometric amount of carbon, which can be difficult to attain in practice. Although the excess carbon can be converted over time into HCN via reaction with $H_2$ and $N_2$, the rate of that reaction (described in Scheme 1, Equation 2B) decreases as the concentration of C approaches 0 (e.g., because the rate is proportional to [C]); this additionally limits the purity that can be obtained within an industrially relevant timescale. In addition, the use of a breathing furnace to alternatingly remove the CO and HCN byproducts (e.g., by applying a vacuum) and introduce the $H_2$ and $N_2$ reactants (e.g., by atmospheric backfilling) is necessarily tied to batch processing, which is incompatible with many presently existing nuclear fuel processing plants.

Aspects of embodiments of the present disclosure provide a method of producing uranium nitride (e.g., processing uranium oxide to uranium nitride) that is less sensitive to an excess amount of carbon, and is therefore able to produce uranium nitride of higher purity compared to related art methods of producing uranium nitride. In addition, the method is amenable to continuous processing, thereby enabling process scaling.

According to some embodiments, a method of producing uranium nitride includes reacting a reaction mixture including uranium carbide with a gas including hydrogen and nitrogen, cooling the reaction mixture to a temperature suitable to produce a phase including $U_2N_3$, and heating the reaction mixture to a temperature suitable to convert the phase including $U_2N_3$ to a phase including UN. In some embodiments, a method of producing uranium nitride includes reacting $UO_2$ with at least three molar equivalents of carbon to form a reaction mixture including uranium carbide, granulating the reaction mixture including uranium carbide prior to reaction with a gas including hydrogen and nitrogen, reacting the reaction mixture including uranium carbide with the gas including hydrogen and nitrogen, cooling the reaction mixture to a temperature suitable to produce a phase including $U_2N_3$, and heating the reaction mixture to a temperature suitable to convert the phase including $U_2N_3$ to a phase including UN.

In addition, example embodiments of the present disclosure provide one or more methods of producing each intermediate product described in the above processes, e.g., methods including combinations of two or more of each of the processes described above.

Throughout this disclosure, when a process or reaction is described as being represented by, approximated by, generally, and/or substantially similar to a specific chemical equation or equilibrium, the equation and/or equilibrium is presented only to illustrate example embodiments of the present disclosure, and is not meant to limit the embodiment to any particular mechanism or theory, or otherwise limit the scope of embodiments of the present disclosure. For example, the process or reaction may be suitably described by another equation or equilibrium different from that presented herein. Furthermore, additional reactants, reagents, products, and/or other species that are not described in the equation or equilibrium may be present in the reaction or process, and the equation or equilibrium may not necessarily provide a full description of the chemistry involved therein. In addition, it will be understood that the reactions and reagents described herein may be modified or substituted by a person of ordinary skill in the art in various ways. Examples of such modifications that are expressly described herein are included as embodiments of the present disclosure, but are not intended to be limiting.

Any suitable method of producing or obtaining uranium carbide may be used. In some embodiments, the method for producing UN includes reacting $UO_2$ with at least three molar equivalents of carbon to form the reaction mixture including uranium carbide. As used herein, the term "at least three molar equivalents" may refer to any amount greater than or equal to about three times the number of moles of $UO_2$. In some embodiments, the $UO_2$ reactant may be converted to a uranium carbide (UC) product in a 1:1 stoichiometric ratio. In some embodiments, the reaction may further produce carbon monoxide gas (CO) as a byproduct, and when the oxygen content of the $UO_2$ reactant is released in the form of CO, the stoichiometry of the $UO_2$ reactant to the CO product may be 1:2. In some embodiments, for example, the method for producing UN may include a process generally following the equilibrium described in Scheme 2, Equation 1:

Scheme 2, Equation 1

$$UO_2 + 3C \rightleftharpoons UC + 2CO_{(g)} \qquad (1)$$

Typically, a slight excess of three equivalents of carbon (e.g., about 3.05 to about 3.1 equivalents) may be used to encourage complete or substantially complete conversion of $UO_2$ to UC. As used to describe this reaction, the term "substantially complete" may refer to a situation in which most of the $UO_2$ reactant has been converted to UC, and only minimal or trace amounts of $UO_2$ remain in the reaction mixture. In some embodiments, "substantially complete" may refer to greater than or equal to 99 wt % conversion of $UO_2$ to one or more products, for example, greater than or equal to 99.5 wt % conversion, or greater than or equal to 99.9 wt % conversion. In some embodiments, "substantially complete" may refer to the point in time at which the percentage yield of the reaction is greater than or equal to 99% based on the actual vs. theoretical yield, for example, greater than or equal to 99.5%, or 99.9% based on the actual vs. theoretical yield. While larger excesses of carbon can also be used according to embodiments of this disclosure, larger excesses of carbon would increase the amount of carbon that would need to be removed as a waste product in subsequent production steps. Therefore, in order to reduce the time, energy, and material costs needed for purification of the final UN product, the number of moles of carbon may be, for example, about 3.0 times to about 4.0 times the number of moles of $UO_2$, and in some embodiments, about 3.0 times to about 3.5 times, about 3.01 times to about 3.2 times, or about 3.05 times to about 3.1 times the number of moles of $UO_2$.

The carbon may be derived from any suitable carbon source as long as it is capable of being co-milled with the $UO_2$. The carbon source may include, for example, graphite, graphene, carbon black, acetylene black, crystalline carbon, amorphous carbon, activated carbon, coke, pitch, or a mixture thereof. The carbon source may have any suitable density or surface area. Although a carbon source with oxygen-containing impurities (e.g., surface functional groups including oxygen, such as carbonate, carboxylate, carbonyl, lactone, and hydroxide) may be used, because some of the carbon atoms will be lost to reduction of those impurities (e.g., as $CO_2$ or CO), a larger amount of the carbon source may be necessary to compensate for that loss. Accordingly, the number (e.g., moles) of carbon atoms in the reaction mixture may be at least about 1.5 times the total number (e.g., moles) of oxygen atoms in the reaction mixture. In some embodiments, for example, the number of carbon atoms may be about 1.5 times to about 1.8 times the total number of oxygen atoms, or about 1.5 times to about 1.6 times the total number of oxygen atoms. However, it will be understood that a person of ordinary skill in the art is capable of selecting other suitable kinds and amounts of the carbon source based on the principles described herein.

In some embodiments, the carbon source and the $UO_2$ are co-milled and pressed into slugs or pellets in order to increase the interfacial surface area between the two reactants, thereby increasing their rate of solid-state diffusion, as well as the overall reaction rate. The co-milling may be achieved using any suitable method, such as ball-milling, wet milling, jet milling, roller milling, cutter milling, etc. In some embodiments, the average particle size of the carbon source and the $UO_2$ after milling may be less than about 500 µm. For example, the average particle size may be less than about 100 µm, less than about 1 µm, or less than about 100 nm.

The size and shape of the slugs or pellets are not particularly limited. For example, the slugs may have an average outer diameter (OD) of about 1 mm to about 5 cm (50 mm), or about 10 mm to about 40 mm. The slugs may have an average length of about 1 mm to about 2 cm (20 mm), or about 5 mm to about 10 mm. The pressing may be achieved using any suitable method or device, and a person of ordinary skill in the art is capable of selecting a method, density, and pressure according to the desired physical characteristics of the pellets.

The reaction between the carbon source and the $UO_2$ may be carried out at a high temperature in order to activate and accelerate solid state diffusion and reduction. As used in the context of this reaction, the term "high temperature" may refer to any temperature at which the reaction is able to proceed to at least 99% conversion, and in some embodiments 99.5% conversion, within an industrially relevant time scale (e.g., within about 24 hours, and in some embodiments within about 12 hours). The conversion ratio may be measured using any suitable method capable of monitoring the concentrations of reactant and product, for example, by X-ray diffraction (XRD) analysis or elemental analysis. In some embodiments, the "high temperature" may be the same temperature used in subsequent parts of the production process requiring an elevated temperature. For example, the reaction may be carried out at greater than about 1352° C., or about 1375° C. to about 2000° C., or about 1400° C. to about 1800° C. The reaction temperature of this process and of other processes described herein may be held substantially constant (e.g., within a range of ±5° C., or for example ±10° C.), or may vary within the described ranges, unless expressly stated otherwise.

In addition, the reaction between the carbon source and the $UO_2$ may be carried out under an atmosphere that does not include oxygen or an oxygen source, e.g., an inert or reducing atmosphere. For example, the reaction may be carried out under argon (Ar), hydrogen ($H_2$), nitrogen ($N_2$), helium (He), or a mixture thereof. In some embodiments, the reaction may be carried out under a static or active vacuum or partial vacuum. Furthermore, the gases included in the atmosphere may be static, or may be flowing. The total pressure or partial pressure of the gas or gases is not particularly limited. In some embodiments, for example, the starting pressure may be about 1 atm or less. Typically, however, the use of a pressure equal to or less than about 1 atm and/or a configuration that continuously removes CO (e.g., vacuum or flowing gases) may favor completion of the CO gas-producing reaction, according to Le Chatelier's principle.

After production of the uranium carbide and carbon monoxide as described herein with respect to Scheme 2, Equation 1, the uranium carbide may be reacted with hydrogen and nitrogen to produce uranium mononitride. In some embodiments, reacting a reaction mixture including uranium carbide with a gas including hydrogen and nitrogen may include a process generally following the equilibrium described in Scheme 2, Equation 2A:

Scheme 2, Equation 2A

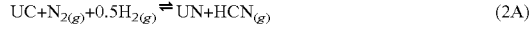

$$UC + N_{2(g)} + 0.5H_{2(g)} \rightleftharpoons UN + HCN_{(g)} \qquad (2A)$$

While the uranium carbide used in this reaction process may be the product of the reaction described herein in connection with Equation 1, any suitable uranium carbide source may be used. Furthermore, although the gas including hydrogen and nitrogen is represented in Equation 2A as a mixture of $N_2$, and/or $H_2$, other suitable forms of such gas may be used according to the example embodiments described herein.

In some embodiments, the method for producing UN includes granulating a reaction mixture including uranium carbide prior to reaction with the gas including hydrogen and nitrogen. As described above, the reaction mixture including uranium carbide may be obtained according to the previously described process, or by any suitable process.

The granulation may be used to increase the surface area of the UC-containing particles that may be exposed to the gas, thereby increasing the rate of this process and allowing for scale-up and processing of large amounts of the reaction mixture.

The granulating may be achieved using any suitable method, such as crushing, ball-milling, wet milling, jet milling, roller milling, cutter milling, etc. The granulating may be carried out under any suitable temperature, atmosphere, and pressure as long as the conditions do not result in unwanted oxidation or introduction of other impurities. For example, the granulating may be carried out under a dry, inert atmosphere (e.g., an oxygen-free atmosphere). As used herein, the term "oxygen-free atmosphere" is used in its art-recognized sense to refer to an atmosphere including less than about 1 ppm to about 20 ppm $O_2$ and about 1 ppm to 10 ppm $H_2O$, and in some embodiments less than about 1 ppm to 3 ppm $O_2$, less than about 1 ppm $O_2$, and/or less than about 0.5 ppm to 1 μm $H_2O$. In some embodiments, the granulating may be carried out under a temperature, atmosphere, and/or pressure substantially similar to that used for the preceding process of reacting $UO_2$ with at least three molar equivalents of carbon to form the reaction mixture including uranium carbide, or the following process of reacting a reaction mixture including uranium carbide with a gas including hydrogen and nitrogen.

The size of the reaction mixture particles after granulating is not particularly limited, and in some embodiments, the average particle size of the UC after granulating may be less than about 500 μm. For example, the average particle size may be less than about 2,000 μm, less than about 100 μm, or less than about 10 μm.

In some embodiments, a method for producing UN includes reacting a reaction mixture including uranium carbide with a gas including hydrogen and nitrogen (e.g., hydrogen atoms and nitrogen atoms). The reaction mixture including uranium carbide may be produced using the processes described herein, including reacting $UO_2$ with at least three molar equivalents of carbon; and/or granulating the reaction mixture including uranium carbide prior to reaction with the gas including hydrogen and nitrogen. However, the uranium carbide may be obtained using any other suitable process.

The stoichiometry of the reaction between uranium carbide, hydrogen atoms, and nitrogen atoms may be 1:2:1. The gas including hydrogen and nitrogen may include any suitable ratio of hydrogen to nitrogen as long as the number of moles of hydrogen and nitrogen provided by the gaseous reactant are both sufficient to react with the uranium carbide according to the 1:2:1 stoichiometry described above, as well as any carbon-containing impurities, as described below. In some embodiments, when the hydrogen atoms are present as hydrogen gas ($H_2$) and the nitrogen atoms are present as nitrogen gas ($N_2$), the stoichiometry of the reaction between uranium carbide, hydrogen gas, and nitrogen gas may be 1:0.5:1 (e.g., 2:1:2). In some embodiments, the gas including hydrogen and nitrogen may include a molar excess of one or both elements relative to the uranium carbide.

The gas including hydrogen and nitrogen may be a single gas or a mixture of gases. In some embodiments, the gas including hydrogen and nitrogen may have a composition including hydrogen atoms and nitrogen atoms. In some embodiments, for example, the gas including hydrogen and nitrogen may include a mixture of hydrogen gas ($H_2$) and nitrogen gas ($N_2$), as discussed above and in connection with Scheme 2, Equation 2A. In some embodiments, the gas including hydrogen and nitrogen may include or be ammonia ($NH_3$) or hydrazine ($N_2H_4$). In some embodiments, the gas including hydrogen and nitrogen may include a mixture of $NH_3$, hydrazine, $N_2$, and/or $H_2$. Additionally, although some example embodiments are described as including a mixture of $H_2$ and $N_2$, it is understood that any suitable gas (such as the gases described herein) may be used in its place.

The total pressure of the gas including hydrogen and nitrogen is not particularly limited, and may change during the course of the reaction or process as gases are consumed and produced. In some embodiments, for example, the starting total pressure of gas (e.g., the starting pressure of the gas including hydrogen and nitrogen) may be about 1 atm. In some embodiments, the starting pressure of the gas including hydrogen and nitrogen may be greater than about 1 atm, for example about 1 atm to about 2 atm, in order to increase the concentration of the reactants and thereby increase the rate of the reaction. When the gas is a mixture of two of more gases, the partial pressure (e.g., ratio) of each gas is not particularly limited. In some embodiments, the gases may be continuously flowed to remove HCN and to favor completion of the HCN gas-producing reaction.

The reaction between the reaction mixture including uranium carbide and a gas including hydrogen and nitrogen may be initiated at any temperature suitable for nitridating the uranium carbide (e.g., converting the uranium carbide to uranium nitride with concomitant production of HCN gas). For example, the reaction may be carried out at a temperature greater than about 500° C., or greater than about 700° C., or greater than about 1000° C. In some embodiments, the reaction may be carried out at greater than about 1350° C., or about 1350° C. to about 2000° C., or about 1400° C. to about 1800° C. In some embodiments, the reaction may be carried out at a temperature that enables the reaction to proceed to at least 99% conversion, and in some embodiments at least 99.5% conversion at an industrially relevant time scale (e.g., within about 24 hours, and in some embodiments within about 12 hours), as described above.

In some embodiments, the reaction mixture including uranium carbide may further include carbon, for example, when the uranium carbide is produced from $UO_2$ using the processes described herein. The amount of carbon is not particularly limited, but should be as low as practically attainable from the uranium carbide production process, as described herein in connection with the process of reacting $UO_2$ with at least three molar equivalents of carbon to produce the uranium carbide. The carbon remaining in the reaction mixture after production of the uranium carbide may react with the gas including hydrogen and nitrogen to produce HCN gas. In some embodiments, for example, reacting a reaction mixture including uranium carbide with a gas including hydrogen and nitrogen may include a process generally following the equilibrium described in Scheme 2, Equation 2B:

Scheme 2, Equation 2B $$C + 0.5 N_{2(g)} + 0.5 H_{2(g)} \rightleftharpoons HCN_{(g)} \qquad (2B)$$

The reaction of carbon with the gas including hydrogen and nitrogen may occur concurrently with (e.g., under the same temperature, pressure, and reaction conditions as) the reaction of UC with the gas including hydrogen and nitrogen (e.g., as described herein in connection with Scheme 2, Equation 2A).

The reactions between UC, C, and the gas including hydrogen and nitrogen may be carried out under an atmosphere that does not include oxygen or an oxygen source, e.g., an inert or reducing atmosphere. In some embodiments, the reaction may be carried out under an atmosphere composed only of the gas including hydrogen and nitrogen. In some embodiments, the atmosphere may further include a noble gas such as argon (Ar), helium (He), or a mixture thereof. The gases included in the atmosphere may be static, or may be flowing.

The gaseous HCN product may be removed using any suitable strategy in order to favor completion of Equations 2A and 2B, according to Le Chatelier's principle. The removal strategy may be continuous or may be carried out in batches. In some embodiments, the HCN may be removed by selective chemisorption. In some embodiments, the HCN may be removed under an intermittent partial vacuum (e.g., a pressure equal to or less than about 1 atm) or may be removed under a continuous or intermittent flow of gas that does not include HCN.

The total pressure or partial pressure of the gas or gases is not particularly limited. In some embodiments, for example, the starting pressure may be about 1 atm. However, Le Chatelier's principle and rate law theory also suggests that in some embodiments, the use of a higher partial pressure of the gas including hydrogen and nitrogen (e.g., at a pressure equal to or higher than about 1 atm) may favor completion of the HCN gas-producing reaction by increasing the concentration of reactants. Therefore, in some embodiments, the reactions of Equation 2A and 2B may be carried out under an atmosphere composed only of the gas including hydrogen and nitrogen at a pressure equal to or higher than about 1 atm, and the HCN gas may be removed in batches or by chemisorption (e.g., when the pressure is above 1 atm), or removed under a flow of gas (e.g., at a pressure of about 1 atm).

As the reaction mixture including uranium carbide and/or carbon reacts with the gas including hydrogen and nitrogen, the reaction mixture may include a mixture of uranium carbide, uranium nitride, and/or carbon. When the reaction is held at a temperature greater than about 1350° C., or about 1350° C. to about 2000° C., or about 1400° C. to about 1800° C., as described above, the components of the reaction mixture may diffuse and be intermixed as a solid solution (e.g., the atoms of both may be intermixed in a single crystal lattice or phase), and may therefore be equivalently described or referred to as $U(N_xC_y)$. This intermixing and stoichiometric equivalency may be generally described by the relationship in Scheme 2, Equation 3:

Scheme 2, Equation 3

$$UC+UN+C \sim U(N_xC_y) \quad (3)$$

Here, the values of x and y describe the relative numbers of nitrogen and carbon atoms, respectively, compared to the number of uranium atoms, and may each be any real number greater than or equal to 0. In Equation 3, $U(N_xC_y)$ is understood to be stoichiometrically and compositionally equivalent to a reaction mixture including uranium carbide, uranium nitride, and/or carbon, but specific reference to $U(N_xC_y)$ may imply mixing of the reaction mixture including uranium carbide, uranium nitride, and/or carbon under high temperatures to thereby attain a more homogenous (evenly mixed) structure. As such, references to the two may be used interchangeably and should be considered in context, i.e., in terms of the ambient temperature and mixing conditions. In some embodiments, for example, the reaction mixture may be held at or above the intermixing temperature for about 24 hours, or about 12 hours to thereby obtain higher degrees of mixing In some embodiments, a method of producing uranium nitride includes cooling a reaction mixture, for example, a reaction mixture including uranium carbide, uranium nitride, and/or carbon and/or a reaction mixture including $U(N_xC_y)$ to a temperature suitable to produce a phase including uranium sesquinitride ($U_2N_3$). The production of $U_2N_3$ may be accompanied by formation of a separate phase including UC. The reaction mixture may be produced by reacting a reaction mixture including uranium carbide with a gas including hydrogen and nitrogen, as described above, or may be any suitable reaction mixture including $U(N_xC_y)$. In some embodiments, cooling the reaction mixture to a temperature suitable to produce a phase including uranium sesquinitride ($U_2N_3$) may include a process generally described by Scheme 2, Equation 4:

Scheme 2, Equation 4

$$U(N_xC_y) \rightarrow U_2N_3 + UC \quad (4)$$

In some embodiments, the reaction mixture may be cooled to a temperature suitable for precipitation of or decomposition to $U_2N_3$, for example, below the phase transition temperature for $UN/U_2N_3$. As used herein, the term "phase transition temperature" is used in its art-recognized sense to refer to a temperature at which a substance undergoes a physical rearrangement in its atomic structure in order to achieve a lower energy state. As used in the context of this reaction, for example, the term "phase transition temperature" refers to the temperature at which an equilibrium (e.g., chemical equilibrium) can be observed between a phase including UN in the presence of a gas including nitrogen (e.g., $N_2$), and a phase including $U_2N_3$. As recognized in the art, movement in either direction away from the equilibrium condition results in selective and substantially complete formation of an appropriate phase. Moreover, as used herein, the term "phase" refers to a substance or a portion of a substance having uniform physical properties. In some embodiments, for example, the physical rearrangement may entail a transition between solid, liquid, gas, or plasma. In some embodiments, the physical rearrangement may entail a transition between crystal lattices or unit cells having different crystal geometries and packing. In some embodiments, a substance including two or more components may partition into two separate phases or substances. However, embodiments of the present disclosure are not limited thereto, and it will be understood that other kinds of phase transitions known in the art are possible.

Figure 2:
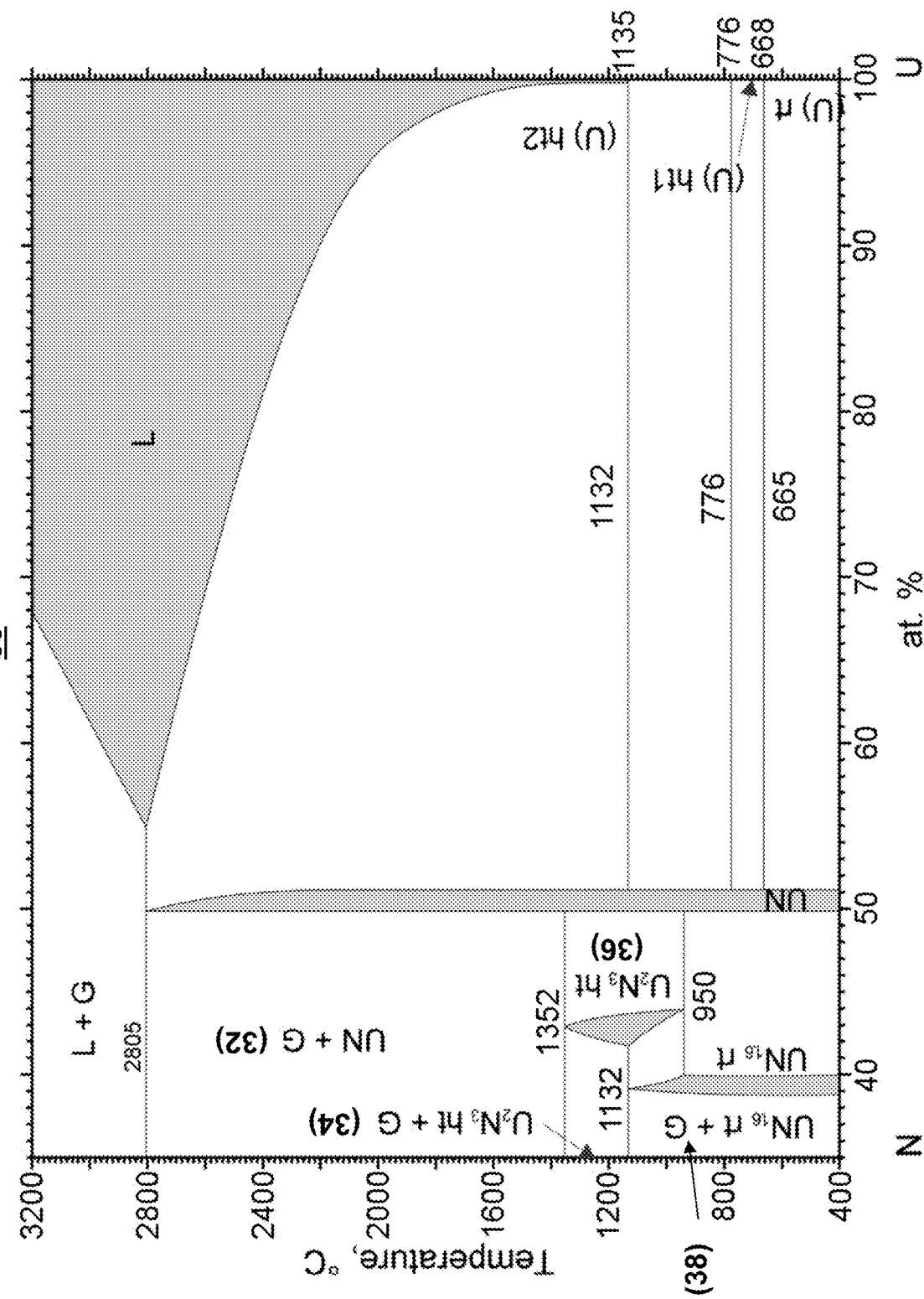
FIG. 2 is a phase change diagram for materials including a mixture of uranium and nitrogen, showing the temperature-dependence of transformations between various uranium- and nitrogen-containing phases, including the transformation between UN and $U_2N_3$.

FIG. 2 is a phase change diagram 30 for uranium and nitrogen, showing various phase transition temperatures for the mixture (e.g., the temperature dependence of transformations between various phases of a material including a mixture of uranium and/or nitrogen), as originally published by ASM International, 2006, Diagram No. 1600412 and modified herein for clarity, the entire content of which is incorporated herein by reference. The phase transition temperature corresponding to the transition boundary between a phase containing UN ("UN+G", 32) and phases containing $U_2N_3$ ("$U_2N_3$ ht+G", 34) and ("$U_2N_3$ ht", 36) for mixtures of uranium and nitrogen between about 35 at. % to about 50 at. % of U can be seen in the leftmost region of the phase change diagram 30.

At a temperature higher than the phase transition temperature, formation of the phase including UN in the presence of gaseous nitrogen ("UN+G", 32) is energetically favored; conversely, at a temperature lower than the phase transition temperature, formation of the phases including $U_2N_3$ (e.g., "$U_2N_3$ ht+G", 34 and "$U_2N_3$ ht", 36) is energetically favored. The phase transition temperature for this equilibrium reaction is about 1352° C., as shown in the drawing. Accordingly, in some embodiments, the reaction mixture including U(N$_x$C$_y$) may be cooled to a temperature lower than about 1352° C.

In some embodiments, when at least part of the UN portion of U(N$_x$C$_y$) undergoes a phase transition to U$_2$N$_3$, the remaining portion of U(N$_x$C$_y$) is enriched in carbon (e.g., UC and/or C). The two phases are mutually insoluble (or poorly soluble), and may therefore precipitate or partition into separate regions or domains. Without being limited to any particular mechanism or theory, it is believed that the mutual insolubility of the two phases is due to their differing crystal structures. Specifically, the crystal structure of the phase including U(N$_x$C$_y$) has a face-centered cubic (fcc) unit cell, while the crystal structure of the phase including U$_2$N$_3$ has a hexagonal unit cell. These unit cells cannot be packed into the same lattice, and therefore precipitate in separate lattices (domains). Accordingly, the fcc domains may be enriched in carbon. The local increase in concentration of the carbon reactant may increase the rate of its conversion to HCN gas, thereby decreasing the overall amount of carbon impurities in the reaction mixture.

In some embodiments, as can be seen in FIG. 2, when the reaction mixture including U(N$_x$C$_y$) and/or U$_2$N$_3$ is further cooled below a second phase transition temperature corresponding to an equilibrium between "U$_2$N$_3$ ht" (high temperature) (36) and "UN$_{1.6}$ rt+G'" (room temperature) (38) at about 1132° C., the phase including U$_2$N$_3$ may further decompose or be converted to a phase including UN$_{1.6}$. The phase including UN$_{1.6}$ has an fcc unit cell, which is similar to and therefore miscible with U(N$_x$C$_y$). Accordingly, cooling the reaction mixture below this second phase transition temperature corresponding to U$_2$N$_3$/UN$_{1.6}$ may result in production of a phase including UN$_{1.6}$ that does not precipitate in a separate domain, such that the nitrogen and carbon content in the reaction mixture does not segregate and the rate of carbon conversion to HCN is not increased. Therefore, in some embodiments, the reaction mixture including U(N$_x$C$_y$) is cooled to a temperature greater than about 1132° C. and lower than about 1352° C. (e.g., about 1132° C. to about 1352° C.) for example, about 1150° C. to about 1340° C., or about 1200° C. to about 1300° C.

The amount of time that the reaction mixture is held at a temperature suitable to produce a phase including U$_2$N$_3$ is not particularly limited, and may be any suitable length of time. In some embodiments, for example, the length of time may be selected to be longer than the timescale of the phase transition in order to encourage substantially complete precipitation of U$_2$N$_3$ and to allow ample time for reaction of any carbon impurities, for example, 5 times or 10 times longer. In some embodiments, the length of time may be selected to correspond to the time after which the rate of HCN production falls below a threshold value, for example, as determined by monitoring of the partial pressure of HCN (P$_{HCN}$). In some embodiments, the length of time may be about 12 to 24 hours, or about 12 hours. However, embodiments of the present disclosure are not limited thereto, and a person of skill in the art is capable of selecting an appropriate reaction time according to the principles described herein.

In some embodiments, a method for producing UN includes heating a reaction mixture to a temperature suitable to convert the phase including U$_2$N$_3$ to a phase including UN. The starting reaction mixture may be produced by cooling a reaction mixture including U(N$_x$C$_y$) to a temperature suitable to produce a phase including uranium sesquinitride (U$_2$N$_3$), as described above, or may be any suitable reaction mixture including U$_2$N$_3$. In some embodiments, heating the reaction mixture to a temperature suitable to convert the phase including U$_2$N$_3$ to a phase including UN may include a process generally described by Scheme 2, Equation 5:

Scheme 2, Equation 5

$$U_2N_3 + UC \rightarrow U(N_xC_z); z < y \qquad (5)$$

In some embodiments, for example, when the reaction mixture is produced according to the process described in Scheme 2, Equation 4, the phase including U$_2$N$_3$ may form a shell on the outer surface of particles of the reaction mixture, which may block or partially block physical contact between the phase including U(N$_x$C$_y$) and the gas including hydrogen and nitrogen, thus slowing the conversion of precipitated carbon to HCN. Accordingly, in some embodiments, the reaction mixture may be heated to re-dissolve the shell.

For example, the reaction mixture may be heated to a temperature suitable for conversion of U$_2$N$_3$ to UN, or for example, above the phase transition temperature for UN/U$_2$N$_3$, as defined herein. Accordingly, in some embodiments, the reaction mixture including U$_2$N$_3$ is heated to a temperature higher than about 1352° C. For example, the reaction may be heated to about 1375° C. to about 2000° C., or about 1400° C. to about 1800° C. The phase including U$_2$N$_3$ is thus converted to a phase including UN, which redissolves (e.g., solutionizes) into the U(N$_x$C$_z$) (where z<y, denoting a lower concentration of carbon than before due to removal of carbon during the cooling of the reaction mixture). Accordingly, when the starting reaction mixture of Equation 5 is a product of Scheme 2, Equation 4, the process described in Equation 5 may be viewed as a return to the conditions and reaction products of Scheme 2, Equation 4 with a decreased concentration of carbon.

The atmosphere and pressure of the reaction mixture during this process may be similar to that used during the process of reacting a reaction mixture including uranium carbide with a gas including hydrogen and nitrogen. In some embodiments, for example, the total pressure may be about 1 atm or greater. In some embodiments, the gases may be continuously flowed.

The amount of time that the reaction mixture is held at a temperature suitable to convert the phase including U$_2$N$_3$ to a phase including UN is not particularly limited, and may be any suitable length of time. In some embodiments, for example, the length of time may be selected to be longer than the timescale of the phase transition in order to encourage substantially complete conversion to UN and to allow ample time for mixing and equilibration of UN and U(N$_x$C$_z$), for example, 10 times or 20 times longer. In some embodiments, the length of time may be selected to correspond to the time after which the nitrogen and carbon anions are uniformly distributed within the reaction particles. In some embodiments, the length of time may be about 12 hrs to about 24 hrs, or about 12 hrs to about 18 hrs. However, embodiments of the present disclosure are not limited thereto, and a person of skill in the art is capable of selecting an appropriate reaction time according to the principles described herein.

One or more example embodiments including each of the processes described above may be represented as a whole by the equations of Scheme 2 (Equations 1 to 5). In Equations 1 to 5, the numbered reactions may not proceed to completion in a stepwise fashion. Instead, two or more reactions may proceed simultaneously as part of an ongoing, complex equilibrium. As such, it will be understood that the species present in the reaction or reactor at any point in time are not necessarily limited to the species listed on one side of any single chemical equation, and that a reaction or reaction mixture described as including or comprising one or more species may include or comprise additional species.

Scheme 2

$$UO_2 + 3C \rightleftharpoons UC + 2CO_{(g)} \quad (1)$$

$$UC + N_{2(g)} + 0.5H_{2(g)} \rightleftharpoons UN + HCN_{(g)} \quad (2A)$$

$$C + 0.5N_{2(g)} + 0.5H_{2(g)} \rightleftharpoons HCN_{(g)} \quad (2B)$$

$$UC + UN + C \approx U(N_xC_y) \quad (3)$$

$$U(N_xC_y) \rightarrow U_2N_3 + UC \quad (4)$$

$$U_2N_3 + UC \rightarrow U(N_xC_z); z < y \quad (5)$$

In some embodiments, the method for producing UN includes repeating the processes of cooling the reaction mixture and heating the reaction mixture until UN having a desired purity is obtained (e.g., z in $U(N_xC_z)$ is decreased to a desired value). For example, the processes may be repeated until a concentration of about 100 ppm C and/or about 100 ppm O is obtained, compared to a concentration of about 1000 ppm C and/or about 1000 ppm O obtained using conventional UN production methods. Once a desired purity has been attained, the process of cooling the reaction mixture can be repeated a final time in the absence of $N_2$ (e.g., after removing the $N_2$) to thereby precipitate the UN having the desired purity as the final product.

Figure 3:
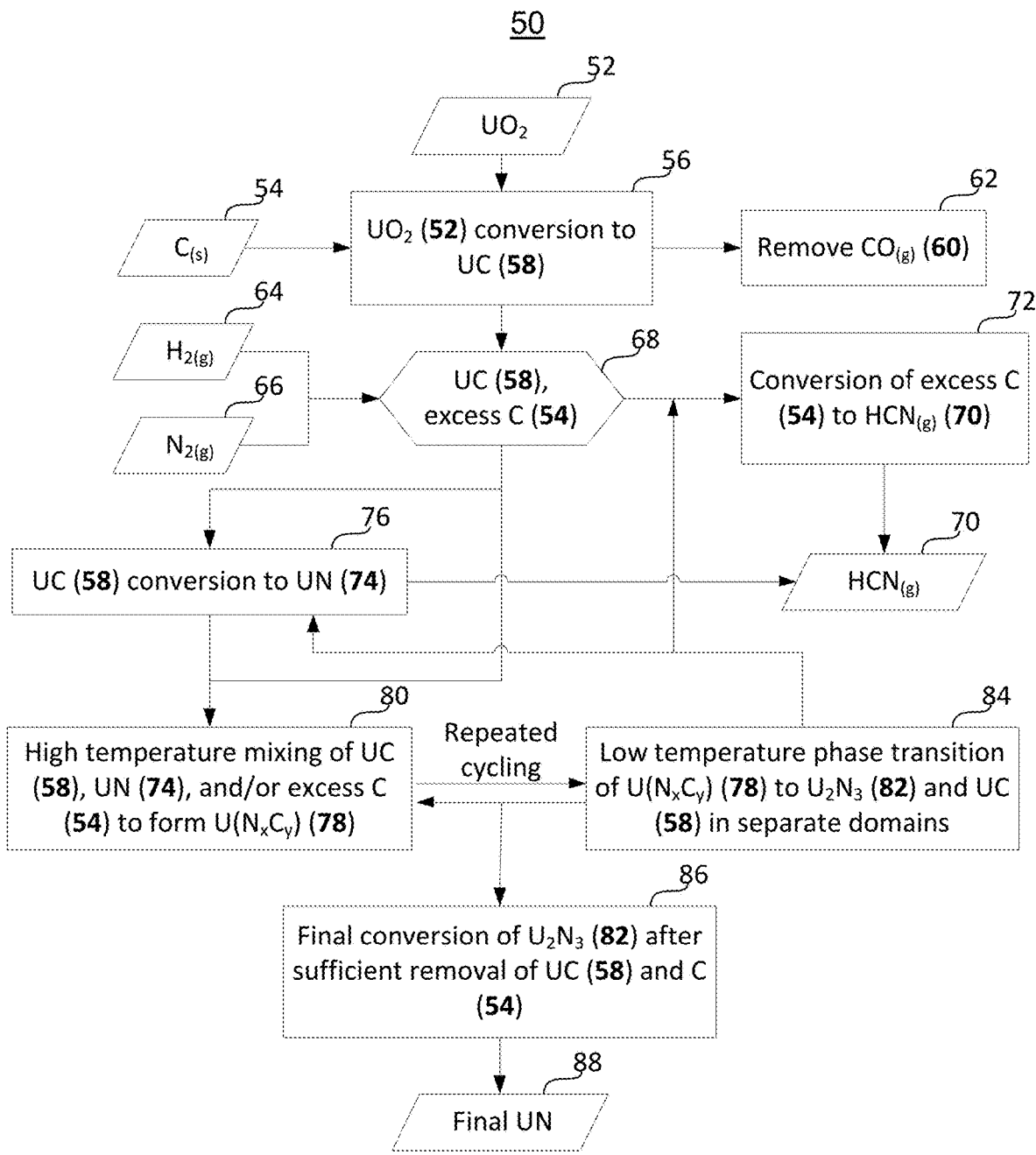
FIG. 3 is a block diagram showing a process or method of converting $UO_2$ to UN according to embodiments of the present disclosure.

FIG. 3 is a block diagram 50 depicting the above-described method of converting $UO_2$ to UN according to embodiments of the present disclosure. According to FIG. 3 and in accordance with Scheme 2, Equation 1, $UO_2$ (52) and $C_{(s)}$ (54) are mixed and reacted (block 56) to produce UC (58) and $CO_{(g)}$ (60), the latter of which (i.e., $CO_{(g)}$) is subsequently removed from the reaction (block 62). The mixture 68 of UC (58) and any excess C (54) is reacted with $H_{2(g)}$ (64) and $N_{2(g)}$ (66). In accordance with Scheme 2, Equation 2B, the excess C (54) in the reaction mixture is converted to $HCN_{(g)}$ (70), which is subsequently removed from the reaction (block 72). The rate of conversion is proportional to the concentration of C (54) in the mixture. Next, in accordance with Scheme 2, Equation 2A, the UC (58) in the reaction mixture is converted to UN (74) (block 76). Meanwhile, in accordance with Scheme 2, Equation 3, the UN (74) and any remaining UC (58) and C (54) are mixed at high temperature to form $U(N_xC_y)$ (78) (block 80). The temperature of the reaction is subsequently lowered, and in accordance with Scheme 2, Equation 4, the $U(N_xC_y)$ (78) undergoes a phase transition and separates into $U_2N_3$ (82) and UC (58), which precipitate in separate crystal domains (block 84). The high local concentrations of UC and C in these crystal domains increase the rate of conversion to $HCN_{(g)}$ (70) according to blocks 72 and 76. The process can be repeatedly cycled between blocks 80 and 84 until enough UC (58) has been converted and enough C (54) has been removed to yield UN (74) or $U_2N_3$ (82) having a desired level of purity (e.g., so that y→0 in $U(N_xC_y)$ (78)). Finally, the temperature is lowered to convert any $U_2N_3$ (82) into UN (88) as a final product (block 86).

In some embodiments, the method for producing UN may be a batch process. For example, the reaction mixture may be held within a single vessel or chamber throughout the entire UN production process, which is heated or cooled and filled or evacuated with suitable gases in a sequence corresponding to the processes included in one or more example embodiments of the present disclosure.

In some embodiments, the method for producing UN may be a continuous process. For example, the reaction mixture may be continuously moved through a series of reaction zones via a belt, a mixer blade, gravity, etc., where each zone is arranged in a suitable sequence and has a temperature corresponding to a process included in one or more example embodiments of the present disclosure. In some embodiments, the reaction mixture comprising uranium carbide may be continuously moved one or more times through a series of at least first, second, and third reaction zones arranged in that sequence, wherein the first reaction zone has a temperature corresponding to the reacting the reaction mixture comprising uranium carbide with the gas comprising hydrogen and nitrogen; the second reaction zone has a temperature corresponding to the cooling the reaction mixture to the temperature suitable to produce the phase comprising $U_2N_3$; and the third reaction zone has a temperature corresponding to the heating the reaction mixture to the temperature suitable to convert the phase comprising $U_2N_3$ to the phase comprising UN (which may be redissolved into the reaction mixture as $U(N_xC_z)$ as described herein). As the reaction mixture is progressively moved between and exposed to the at least the first, second, and third reaction zones, the reaction mixture may undergo a series of reactions such as those described in Scheme 2, Equations 2 to 5. In some embodiments, the reaction mixture may be cycled through one or more of the reaction zones in the same sequence to thereby repeat the heating and cooling cycles and their associated reactions. For example, the reaction mixture may be subsequently cycled multiple times between the second reaction zone and the third reaction zone, (corresponding to Scheme 2, Equations 4 and 5, and blocks 80 and 84 in FIG. 3). When the method for producing UN is a continuous process, the process may be carried out under a single atmospheric composition, e.g., a reducing atmosphere and/or a gas including hydrogen and nitrogen, such as a mixture of $H_2$ and $N_2$, as described above.

The following examples and experimental data are provided for illustrative purposes only, and do not limit the scope of the embodiments of the present disclosure.

EXAMPLES

Uranium oxide powder (processed in-house) and graphite powder (200 mesh, 99.9995% metals basis, Alfa Aesar, Ward Hill, Mass.) were co-milled using a high energy zirconia ball mill (Spex SamplePrep, Metuchen, N.J.) for 100 minutes before being pressed at 370 MPa into 40 gram compacts with a 10 mm nominal thickness using a 40 mm outer diameter punch and die. Each compact was then placed into a tungsten carrier, with a tungsten foil serving as a diffusion barrier between the sample and the tungsten carrier. The compact was heated to 1730° C. under vacuum and held at temperature for 24 hours. The oxygen content of the reaction mixture following this uranium carbide formation process was measured to be 950 wppm using an oxygen/nitrogen analyzer (EMGA-820, Horiba Instruments, Irvine, Calif.).

The reaction mixture including UC was screened through a #12 (e.g., 12 mesh) sieve, producing granules having an average diameter of about 1.5 mm. This material was again loaded onto a tungsten carrier with a fresh tungsten foil. The reaction mixture was heated to 1730° C. under a flowing atmosphere of 95% $N_2$/5% $H_2$ for twelve hours. The temperature was then decreased to 1330° C., and the material was again held for twelve hours, completing one heating/cooling cycle.

The heating/cooling cycle was repeated two more times, resulting in three total heating/cooling cycles. The oxygen and carbon content of the material after three cycles was measured to be 180 wppm and 580 wppm, respectively, using an oxygen/nitrogen analyzer (EMGA-820, Horiba Instruments, Irvine, Calif.) and a carbon/sulfur analyzer (EMIA-8100, Horiba Instruments, Irvine, Calif.).

The tungsten foil in the carrier was freshly replaced, and three more heating/cooling cycles were repeated. The oxygen and carbon content was found to be 140 and 290 wppm following this second treatment, respectively, demonstrating that the phase transitions associated with repeated temperature cycling are effective in quickly decreasing the concentration of carbon-containing impurities (e.g., UC and C), and to a lesser extent, oxygen-containing impurities (e.g., $UO_2$) during production of UN according to embodiments of the present disclosure.

As described herein, example embodiments of the present disclosure may enable production of uranium nitride having improved purity. In addition, the methods according to embodiments of the present disclosure, as described herein, may be compatible with continuous chemical processing methods and plants. For example, existing plants for nuclear fuels processing (such as those for producing $UO_2$ nuclear fuel) using continuous chemical processing facilities may be readily retrofitted or adapted to produce UN according to embodiments of the present disclosure. Furthermore, the methods according to embodiments of the present disclosure, as described herein, may be robust to processing deviations (e.g., excess carbon, temperature, and time fluctuations) during processing. In contrast, conventional processes for producing UN are more sensitive to the amount of carbon reactant, as described above, and may be subject to oxidation and subsequent loss of product if the breathing furnace is inadvertently halted during a shutdown.

While certain exemplary embodiments of the present disclosure have been illustrated and described, those of ordinary skill in the art will recognize that various changes and modifications can be made to the described embodiments without departing from the spirit and scope of the present invention, and equivalents thereof, as defined in the claims that follow this description. For example, although certain components may have been described in the singular, i.e., "an" inert gas, "a" reaction mixture, and the like, one or more of these components in any combination can be used according to the present disclosure.

Also, although certain embodiments have been described as "comprising" or "including" the specified components, embodiments "consisting essentially of" or "consisting of" the listed components are also within the scope of this disclosure. For example, while embodiments of the present invention are described as comprising reacting a reaction mixture; cooling the reaction mixture; and heating the reaction mixture, embodiments consisting essentially of or consisting of these items are also within the scope of this disclosure. Accordingly, a method of producing uranium nitride may consist essentially of reacting a reaction mixture, cooling the reaction mixture, and heating the reaction mixture. In this context, "consisting essentially of" means that any additional components or process actions will not materially affect the products and byproducts produced by the reaction.

As used herein, unless otherwise expressly specified, all numbers such as those expressing values, ranges, amounts or percentages may be read as if prefaced by the word "about," even if the term does not expressly appear. Further, the word "about" is used as a term of approximation, and not as a term of degree, and reflects the penumbra of variation associated with measurement, significant figures, and interchangeability, all as understood by a person having ordinary skill in the art to which this disclosure pertains. Any numerical range recited herein is intended to include all sub-ranges subsumed therein. Plural encompasses singular and vice versa. For example, while the present disclosure may describe "an" inert gas or "a" reaction mixture, a mixture of such inert gases or reaction mixtures can be used. When ranges are given, any endpoints of those ranges and/or numbers within those ranges can be combined within the scope of the present disclosure. The terms "including" and like terms mean "including but not limited to," unless specified to the contrary.

Notwithstanding that the numerical ranges and parameters set forth herein may be approximations, numerical values set forth in the Examples are reported as precisely as is practical. Any numerical value, however, inherently contains certain errors necessarily resulting from the standard variation found in their respective testing measurements. The word "comprising" and variations thereof as used in this description and in the claims do not limit the disclosure to exclude any variants or additions.

What is claimed is:

1. A method of producing uranium nitride (UN), the method comprising:
   reacting a reaction mixture comprising uranium carbide with a gas comprising hydrogen and nitrogen;
   cooling the reaction mixture to a temperature below a phase transition temperature between a phase comprising UN and a phase comprising $U_2N_3$, wherein such temperature ranging from 1352° C. to 1132° C., to thereby produce a phase comprising $U_2N_3$; and
   heating the reaction mixture to a temperature above the phase transition temperature between the phase comprising UN and the phase comprising $U_2N_3$, wherein such temperature is greater than 1352° C., to thereby convert the phase comprising $U_2N_3$ to the phase comprising UN.

2. The method of claim 1, the method further comprising:
   reacting $UO_2$ with at least three molar equivalents of carbon to form the reaction mixture comprising uranium carbide.

3. The method of claim 2, wherein the at least three molar equivalents of carbon comprises an excess of three molar equivalents of carbon.

4. The method of claim 2, the method further comprising:
   granulating the reaction mixture comprising uranium carbide prior to reaction with the gas comprising hydrogen and nitrogen.

5. The method of claim 1, the method further comprising:
   repeating the cooling the reaction mixture and heating the reaction mixture to purify the UN.

6. The method of claim 2, wherein the reacting $UO_2$ with at least three molar equivalents of carbon is accomplished under an active vacuum.

7. The method of claim 2, wherein the reacting $UO_2$ with at least three molar equivalents of carbon is accomplished under an inert atmosphere comprising $N_2$, Ar, He, $H_2$, or a mixture thereof.

8. The method of claim 1, the method being a continuous process wherein the reaction mixture comprising uranium carbide is continuously moved through a series of at least first, second, and third reaction zones arranged in a sequence, wherein:

the first reaction zone has a temperature corresponding to the reacting the reaction mixture comprising uranium carbide with the gas comprising hydrogen and nitrogen;

the second reaction zone has a temperature corresponding to the cooling the reaction mixture to the temperature below the phase transition temperature between the phase comprising UN and the phase comprising $U_2N_3$, wherein such temperature ranging from 1352° C. to 1132° C., to produce the phase comprising $U_2N_3$; and the third reaction zone has a temperature corresponding to the heating the reaction mixture to the temperature above the phase transition temperature between the phase comprising UN and the phase comprising $U_2N_3$, wherein such temperature is greater than 1352° C., suitable to convert the phase comprising $U_2N_3$ to the phase comprising UN.

9. The method of claim 1, wherein the heating the reaction mixture to the temperature above the phase transition temperature between the phase comprising UN and the phase comprising $U_2N_3$ to convert the phase comprising $U_2N_3$ to the phase comprising UN comprises heating the reaction mixture to a temperature of 1375° C. to 2000° C.

\* \* \* \* \*